Nov. 2, 1943.    L. A. KILGORE ET AL    2,333,575
VARIABLE-SPEED INDUCTION-MOTOR DESIGN AND CONTROL
Filed Aug. 22, 1941    2 Sheets-Sheet 1

WITNESSES:
Edward Michaels
Nw. C. Goode

INVENTORS
Lee A. Kilgore and
Michael Liwschitz.
BY
O. C. Buchanan
ATTORNEY

Nov. 2, 1943.    L. A. KILGORE ET AL    2,333,575
VARIABLE-SPEED INDUCTION-MOTOR DESIGN AND CONTROL
Filed Aug. 22, 1941    2 Sheets-Sheet 2

WITNESSES:

INVENTORS
Lee A. Kilgore and
Michael Liwschitz.
ATTORNEY

Patented Nov. 2, 1943

2,333,575

UNITED STATES PATENT OFFICE 2,333,575

VARIABLE-SPEED INDUCTION-MOTOR DESIGN AND CONTROL

Lee A. Kilgore and Michael Liwschitz, Wilkinsburg, Pa., assignors to Westinghouse Electric & Manufacturing Company, East Pittsburgh, Pa., a corporation of Pennsylvania Application August 22, 1941, Serial No. 407,939

19 Claims. (Cl. 172—274)

Our invention relates to large wound-rotor induction motors or asynchronous dynamo-electric machines which are designed for stable operation over a wide range of speed-control, or for long-sustained operation at high slips; and it has particular relation to doubly-fed induction motors of the type mentioned, by "doubly-fed" referring to motors having voltage-generating sources connected to both the primary and secondary circuits thereof, for supplying power to, and taking power from, said circuits, respectively, or for otherwise maintaining predetermined operating conditions of the induction machine.

The principal object of our invention is to provide ways and means for avoiding certain obscure hunting-conditions in such motors and speed-control systems therefor. This hunting results from a negative damping torque which is developed in a doubly-fed induction motor, or even during the starting conditions of a singly-fed motor, and which altogether escapes detection in the ordinary methods of machine-design, calculation, and analyses, or in the ordinary uses of induction motors, but which is observed, with sometimes very objectionable consequences, in certain special combinations in which there may be two or more dynamo-electric machines which can exchange power between each other at a natural pulsating frequency. We have developed a technique for mathematically calculating this negative damping torque, but it is believed that it will suffice, for the purpose of explaining the remedial steps which we have taken, if we confine our present description to an explanation of the underlying fundamental considerations which lead to the development of negative damping torque.

An ordinary, or what may be called positive, damping torque is a torque which tends to slow down any departure of the motor-speed from a predetermined steady-state speed, so that, if any transient condition in the load or in the supply-system should cause the motor-speed to momentarily increase slightly, the positive damping torque will be in a direction to decelerate the motor, and of a magnitude dependent upon a natural oscillating-frequency of the motor-system. On the other hand, if the motor-speed should momentarily become reduced below its normal steady-state value, a positive damping-torque in the machine would have a component in a direction to accelerate the motor back to its main steady-state speed. If the damping torque is negative, its effects are opposite in direction, so that, if the motor-speed should momentarily increase beyond its steady-state value, a negative damping torque would have a component in a direction tending to still further increase the motor-speed during a portion of a half-cycle of the oscillating frequency, the damping torque then falling off to zero and reversing and decelerating the motor below its means or normal operating-speed, and increasing the speed-swings with an accumulating action during successive half-cycles of the oscillating frequency.

Theoretical considerations, verified by our newly developed methods of mathematical analysis, and confirmed by actual measurements on tests, have indicated that the principal source of such a negative damping torque is to be found in the direction of the slope, or rate of change, of the speed-torque curve which the motor would have if its secondary windings were short-circuited. Now ordinarily, in a wound-rotor induction motor, there is no particular significance to the slope of the speed-torque curve with the rotor short-circuited, at speeds below the pull-out point, because the motor is not operated with a short-circuited rotor at such speeds or under such conditions. The whole point of providing a wound rotor—that is, a secondary motor-winding having polyphase terminals which are brought out to sliprings—is to make it possible to connect an external secondary resistance, or other regulating means, across the slipring-terminals of the secondary or rotor winding, and the motor does not operate at speeds below its maximum-torque or pull-out point except when it has an external resistance or other speed-controlling load connected to its slipring-terminals. It is not ordinary practice, therefore, to pay any attention to the slope of the speed-torque curve below the pull-out point, with the secondary short-circuited, in an ordinary design of a wound-rotor induction motor, as said slope is immaterial and has heretofore been neglected.

Let us consider, however, the slope of the speed-torque curve of an ordinary induction motor with short-circuited secondary. At standstill, there is a certain torque which begins to accelerate the motor, and as the motor accelerates, this torque increases up to a certain maximum value called the pull-out point, which occurs at a speed some 2 to 10% below the synchronous speed, more or less, depending upon the resistance and the reactance of the rotor-winding. At speeds above the pull-out point, corresponding to the normal operational speeds of the motor, (when operating with a short-circuited secondary), the torque begins to decrease again, as the speed increases, and as the speed approaches closely to the synchronous speed, the torque rapidly falls off and becomes zero at the synchronous speed. When it is desired to operate such a wound-rotor induction-motor at a low speed, or high slip, it is customary to connect a resistance or other energy-consuming device in the secondary circuit, or across the slipring-terminals of the secondary windings, so that one will then have a different kind of speed-torque curve, dependent upon this increased value of the effective secondary resistance, and this speed-torque curve will start out with a standstill-torque of a higher value, and will reach its maximum torque at a lower pull-out speed, so that the motor will operate, at a torque necessary below the pull-out torque, and at a speed above the pull-out speed, but at a lower speed that the speed which was obtained before the resistance was added. If a still lower speed is desired, a larger resistance is used.

The conditions just outlined are the conditions of operation of a normal wound-rotor induction motor. There can be no hunting between the motor and the driven load, such as a fan or blower or other driven machine, as a result of the operating conditions of the motor, as the following considerations will readily show. Thus, assume, for the moment, that the torque required by the load should momentarily change in such manner as to produce a momentary slight increase in the speed of the motor. The motor, operating at a speed above its pull-out speed, and approaching closer toward its synchronous speed, will produce a reduced torque, which will cause the motor to slow down again to its normal steady-state running-speed which it had before the assumed load-transient occurred. Hence, there will be no hunting, because the damping is positive.

In our invention, the secondary of the motor is connected to another electrical system, and it can readily be shown that hunting can exist here, if the motor is operating without external resistance in its secondary circuit, and at a speed below the pull-out speed which the motor would have if the motor-secondary were merely short-circuited, rather than being connected to a slip-frequency line or voltage-source. In other words, the wound-rotor induction motor is being energized in both its primary windings and its secondary windings, so as to attempt to hold the speed of the motor at an arbitrary point below the pull-out speed which the motor would have if an external source of voltage were not applied to its secondary terminals or sliprings. Between the motor and this externally applied slip-frequency line or apparatus, there can be hunting as a result of the internal operating conditions of the motor, as can be seen from considerations such as the following.

Let us suppose that, for some reason, there is a momentary slight increase in the motor-speed over what it should be, for the electrical power which is being taken off from the secondary windings of the motor, or for the slip-frequency voltage which is being maintained at the sliprings. Then this momentary increase in the speed of the motor will cause the motor to operate at a speed closer to its maximum torque or pull-out speed, thus causing the motor to develop more torque, thus causing the motor to aggravate the trouble by still further increasing its speed. Thus, the motor damping, instead of restoring the steady-state conditions and damping out the oscillation, operates in the very reverse manner, to increase the oscillation. The result is a cyclic variation in the speed of operation of the motor, at the natural oscillating frequency of the electrical system of which the motor and the secondary load are a part, which oscillating frequency may commonly be of the order of 2 or 3 cycles per second, more or less. This phenomenon will persist as long as the system referred to lacks positive damping in some part other than the motor and in an amount sufficient to exceed the negative damping of the motor. It is this situation which our invention is designed to avoid.

An object of our invention is to change the motor-torque characteristics so as to reduce the above-described negative damping to a value which is less than the positive damping which is available in the rest of the oscillating system, or in some instances to actually change the negative damping to positive damping. Since (barring refinements or relatively small factors in the situation), the sign and magnitude of the motor-damping is dependent upon the sign and magnitude of the slope of the speed-torque curve, our object, in reference to the elimination or mitigation of negative damping, may be stated as being to cause the speed-torque curve of a doubly-fed, variable-speed induction motor to approach a zero slope, or even to have a negative slope, over the desired range of operational speeds of the motor, so that the motor-torque even decreases slightly, as the motor-speed increases, throughout said operating range wherein hunting is to be avoided, referring to the speed-torque curve which the motor would have during singly-fed operation with its secondary terminals short-circuited.

More specifically, it is an object of our invention to mitigate the above-mentioned negative damping, by producing a motor having, in effect, a variable resistance in its secondary windings, so that, at high motor-speeds, or low slip, the motor will have a speed-torque characteristic similar to that of an efficient, low-resistance secondary, while at higher and higher slips (or lower speeds), the effective secondary-resistance of the motor will automatically and progressively increase, while the reactance decreases, both effects causing the motor to develop higher torques at the lower speeds. There are two ways in which this automatic resistance-changing effect can be obtained. One way is to utilize deep rotor-bars or conductors, so that the so-called skin-effect at high slip-frequencies (or low motor-speeds) will cause a circulation of eddy-currents between the upper and lower portions of the deep bars, so as to decrease the effective cross section of bar which is available for carrying the secondary currents of the motor, thus increasing the secondary resistance.

A second way of producing the automatic variable effective resistance of the secondary winding is to utilize an ordinary secondary winding of fairly constant resistance, that is, shallow bars, and to connect an external reactance in series with the winding, that is, in series with the circuit which is connected to the sliprings of the motor, said reactance being shunted by a resistance. Thus, at high speeds or low slip-frequencies, the voltage-drop across the reactance is very small, so that the reactance practically short-circuits the resistance, but at high slips, more and more of the secondary current divides and flows through the resistance, thus increasing the effective resistance of the secondary circuit. The slip-frequency or speed at which the resistance becomes effective can be predetermined by the proper choice of the relative values of resistance and reactance. The reactance may be either capacitive or inductive; if inductive, it may be advantageously connected across the corresponding slip-rings of two similar wound-rotor induction motors which are to be simultaneously operated, at the same speeds, from a common speed-controlling energy-translating device connected in the secondary circuit, and the connection to the energy-translating device may be made to the mid-point of the inductance, so that the inductance is effective in the circuit between the secondary windings of the two machines, and is substantially non-inductive in the speed-controlling circuit between the machine and the speed-controlling energy-translating device.

Further objects of our invention relate to special speed-controlling systems for either a single, wound-rotor induction motor or for a plurality of similar motors driving separate loads and controlled by a common speed-controlling means or apparatus.

With the foregoing and other objects in view, our invention consists in the parts, structures, apparatus, methods and systems hereinafter described and claimed, and illustrated in the accompanying drawings, wherein:

Figure 8:
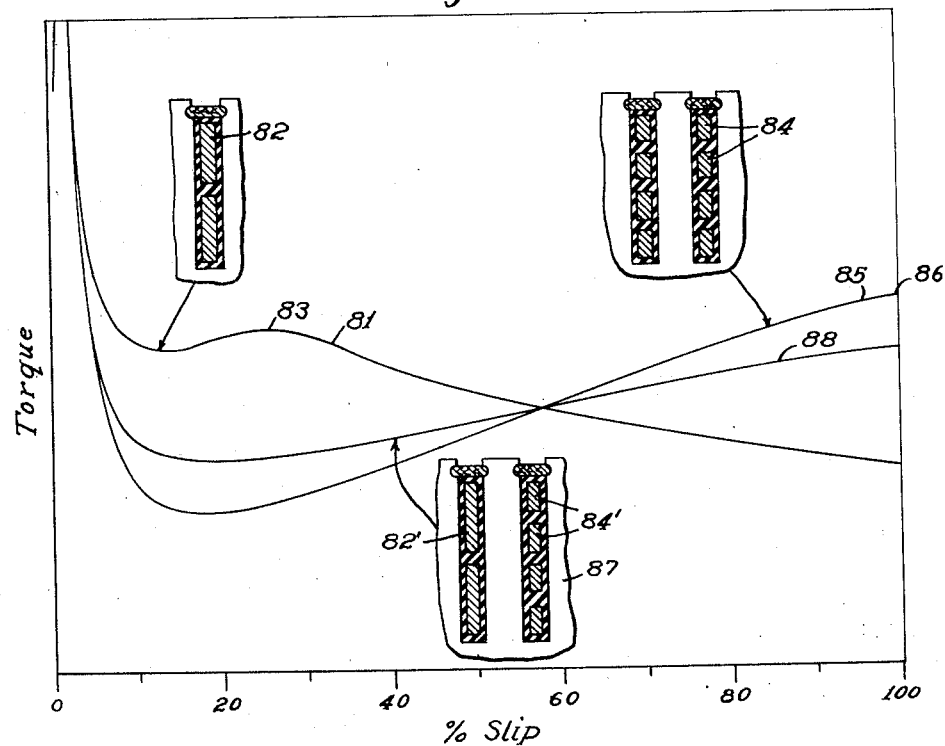
Figure 9:
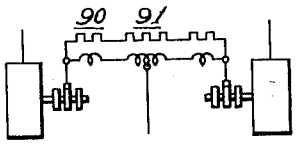

Fig. 8 is a curve-diagram illustrative of the different types of speed-torque characteristics which are obtainable with different types of deep-bar rotor-windings, and with combinations of two different kinds of deep-bars having maximum torques at different speeds; and Fig. 9 is a diagrammatic view illustrative of the manner in which a similar effect may be obtained with conventional wound-rotor machines having a plurality of pairs of resistance-shunted reactors in the external secondary circuits.

Figure 1:
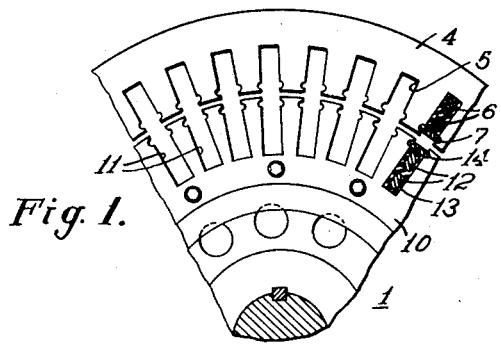
Figure 1 is a fragmentary cross-sectional view of a motor involving our invention in a deep-bar design.

In Figure 1, we show a large wound-rotor polyphase induction motor or asynchronous machine 1 such as would be energized from a three-phase supply line 2 (Fig. 3) of more than 2,000 volts. Such a motor has a stator-member comprising a magnetizable stator-core 4, having fully open slots 5 in which the three-phase primary winding 6 is disposed, the coil-sides of said primary winding being retained in the respective slots 5 by means of wedges 7. Cooperating with the stator-core 4 is a rotor-member comprising a magnetizable core 10 which, in the form of our invention illustrated in Fig. 1, has fully open rotor-slots 11 in which are disposed the coil-sides or conductor-bars 12 of a double-layer secondary winding 13, the coil-sides being retained within the respective slots by wedges 14.

Figure 3:
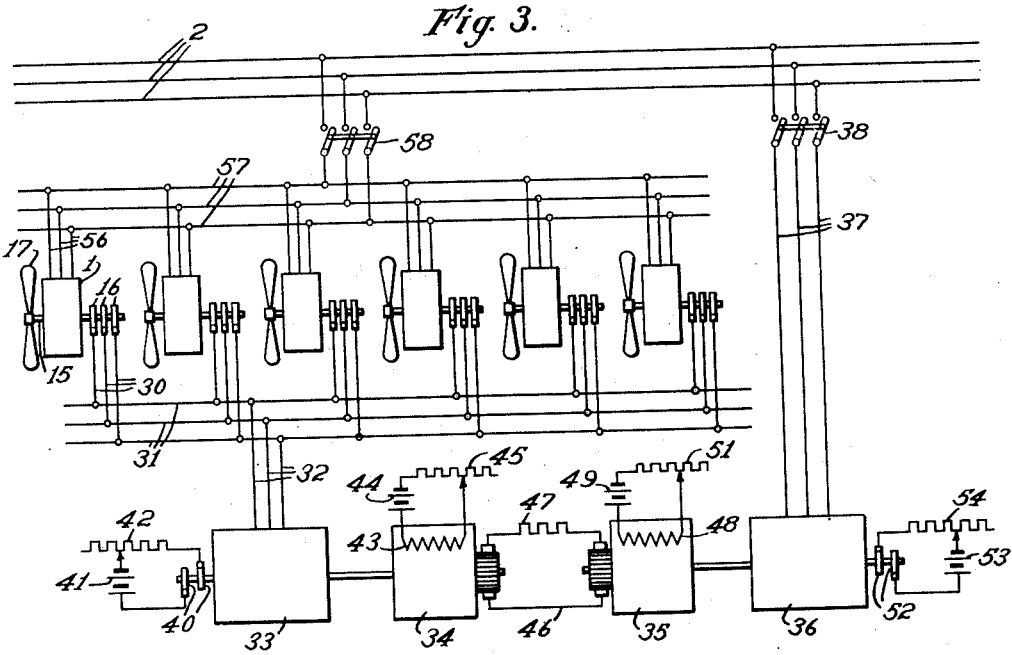
Fig. 3 is a diagrammatic view of circuits and apparatus for controlling the speed of a plurality of our deep-bar motors.

As shown in Fig. 3, the rotor is mounted on a shaft 15, and is provided with three sliprings 16 which constitute the terminals of the secondary winding 13. The shaft 15 drives a load of any description, such as fan or blower 17, as shown in Fig. 3.

In accordance with our invention, the secondary-winding conductors 12 are made in the form of deep bars having a radial depth of the order of one and one-half inches, or sufficient to produce the previously described skin-effect by eddy-currents at high slip-frequency. Deep-bar rotor members have previously been known in squirrel-cage motors, whereby there are temporarily effective starting-torques which have been obtained with low-resistance squirrel-cage windings so that the machine would operate, during running conditions, at a low slip, that is, at a speed close to synchronous speed, and hence at a high efficiency. Such motors, however, have not been required to operate, for sustained periods of time, during the high-slip conditions when the skin-effect has been sufficient to cause the squirrel-cage bars to have a high effective resistance, this being so, because the motor quickly pulls up to its running-speed, upon being energized, the secondary winding being designed so that it will be grossly overheating itself during this brief starting-period, relying upon the shortness of the starting-period to prevent the rotor from attaining a temperature which is high enough to be damaging.

It will be noted that our invention relates, not to squirrel-cage secondary windings, but to wound-rotor secondary windings, that is, windings which are connected to polyphase terminals in the form of the sliprings 16. In such wound-rotor motors, the secondary members are wound, or provided with sliprings, for the express purpose of making it possible to operate the motors, for sustained periods of time, at different slips, or at different motor-speeds, and for the express purpose of being able to control said slip or said speed, by controlling the amount of resistance which is connected externally to the slipring-terminals of the secondary winding. Under these circumstances, the wound secondary windings of wound-rotor induction motors have heretofore been universally designed with low-resistance, shallow-bar windings, so that the resistance-losses, and hence the rotor-heating, would be low, even at high slip-frequencies. In this manner, the heating which is produced by the resistance of the secondary winding, when the motor is operating at high slips, can be produced, for the most part, in external resistors which can be designed to have any required heat-radiating capacity, said resistors being placed outside of the motor and being electrically connected to the secondary-winding sliprings of the motor.

It will thus be seen that our design is unique, in the art of building wound-rotor machines, in building such machines with deep bars having a depth sufficient to produce a variable-resistance effect within the secondary winding itself, independently of any energy which is withdrawn from the slipring-terminals of the secondary winding for the purpose of controlling the operational speed of the motor. While we prefer to utilize a depth of about an inch and a half, for our rotor-bars 12, we are not limited thereto, as the design-conditions for different motor-applications vary, both as to the size of the motor and as to the amount of negative damping (if any) which can be tolerated. In a 6,000 horsepower motor, we have found a depth of 1.5 inches quite satisfactory, or 1.4 inches for the upper bars and 1.6 inches for the lower bars in each slot. In a 20,000 horsepower motor, it might be satisfactory to utilize a 1.7 inch depth of bar, whereas, in a 2,000 horsepower motor, we might get along with a 1.2 or 1.3 inch depth. These figures apply only to large motors of 2,000 horsepower or over, or motors in which the primary-winding line-voltage is over 2,000 volts, and in which the primary winding 6 is composed of preformed coils which have their coil-sides fully formed and insulated prior to inserting the coils in the fully open slots 5 of the stator.

In our motor, because of our use of deep rotor-bars 12 in which resistance-changing skin effects are intentionally produced as a result of eddy currents flowing therein at high slip-frequencies, it is practically essential for us to depart from the usual rotor-construction and to utilize a construction in which the rotor-slots are fully open, as indicated at 11 in Fig. 1, and in which the rotor-bars 12 have an overall width (including their surrounding insulation) substantially equal to the width of the slots, so that the bars will radiate heat, from both sides, to the side-walls of the slot 11 in the rotor-core 10. This particular open-slot rotor-construction is more fully described and claimed in an application of M. M. Liwschitz, Serial No. 407,938, filed August 22, 1941, and entitled "Induction motor with open-slot rotor-windings." This construction is practically necessary, when the rotor-bars are made very deep, as in our motors, because of the excessively large losses which are produced in the rotor during sustained high-slip operating-speeds. Thus, in our 6,000 horsepower motor, we use nearly as much rotor-copper as would be utilized in a normal 20,000 to 30,000 horsepower motor. If we had not utilized the open rotor-slot design of the aforesaid Liwschitz application, but had adhered to the normal wound-rotor construction utilizing partially closed slots, the size and cost of our machine would have been considerably greater.

Figure 2:
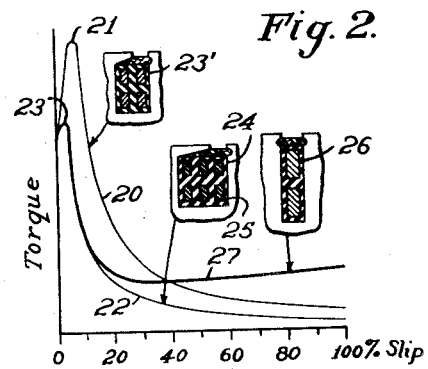
Fig. 2 is a curve-diagram which will be referred to in explanation of the speed-torque characteristics.

The effect of the deep-bar design upon the speed-torque characteristics of the motor is illustrated in Fig. 2, wherein the curve 20 may be taken as illustrative of the speed-torque characteristics of a conventional wound-rotor motor of the size to which our invention relates, the torque being plotted on the vertical axis, and the slip being measured on the horizontal axis. In a practical application of our invention, it is required that the motor operate stably at slips between 12% and 85%. It will be noted that the 12% slip-point comes fairly close to the pull-out point 21 of such a motor, and that the slope of the torque-slip curve is negative throughout the entire range between 12% slip and 85% slip, which means negative damping in the motor throughout this range.

In accordance with our invention, it is desirable to reduce the rotor-resistance, at low slips, to the lowest practicable value, in order to cause the maximum-torque point 21 to occur at as low a slip as possible, as much below the minimum-slip value of 12% as is practicable. This means a larger cross-section of the rotor-bars, and more copper in the rotor-member, which usually means a higher leakage-reactance and a lower pull-out torque, giving a curve which would look something like the curve 22 of Fig. 2, with the pull-out point moved from 21 to 23. The slope of the torque-slip curve 22, within the range from 12% to 85% slip, is still negative, but it will be observed that the steepness of the slope is not as great as the corresponding portion of curve 20. It is assumed that both of the curves 20 and 22 are obtained with conventional wound-rotor designs utilizing partially closed slots as indicated at 23' and 24 in Fig. 2, the rotor-bars being stranded or subdivided, as indicated at 25, so that there are two or three bars transversely of the width of each slot.

In our design, we preferably go to a deep-bar design, which is symbolically indicated at 26 in Fig. 2, and we achieve a speed-slip curve such as is indicated at 27 in Fig. 2. This curve may be similar to the curve 22 at low slips, but at high slips the skin-effect resulting from the deep bars increases the rotor-resistance and also decreases the rotor reactance, both of which effects operate to produce higher torques at high slips. Thus, the curve 27 departs from the curve 23 in the required speed-range from 12% slip to 85% slip, or from 20% slip to 100% slip, so that we have a standstill torque (at 100% slip) which is at least as high as 0.7 times the torque at 20% slip. Preferably, we have a slightly rising slope of the curve 27 throughout practically all of the variable-speed operating-range, or, say, in the range between 20% slip and 85% slip, or between 20% and 60% slip, or over any other predetermined speed-range.

Fig. 3 shows our present preferred form of speed-control system, for a plurality of mechanically-independent, similar motors 1 each driving its own independent load 17, but all controlled through a common speed-controlling system wherein secondary power is fed back into the main supply-line 2. Each motor is preferably designed, in accordance with the principles illustrated and explained in connection with Figs. 1 and 2, with deep rotor-bars. The secondary leads 30, which are connected to the slipring-terminals 16 of each motor 1, are bussed together through a common three-phase bus 31, to which an electrical load-circuit 32 is connected, for the purpose of consuming electrical energy therefrom. In the system shown in Fig. 3, the electrical energy is recovered, and returned to the supply-line 2, through a combination of four machines comprising a synchronous machine 33 which is energized from the secondary load-line 32, a direct-current generator 34 driven by the synchronous motor 33, a direct-current motor 35 which is electrically energized from the generator 34, and a polyphase generator 36 which is driven by the direct-current motor 35, and which has its polyphase terminals 37 connected to the supply-line 2, as by means of a switch 38.

The synchronous motor 33 is provided with a direct-current exciting-means, as symbolized by the two sliprings 40, which are energized from a battery 41 through a field-rheostat 42, whereby leading current can be withdrawn from the motor-secondary terminals 16 so as to correct the power factor of the motors, while at the same time controlling the speed thereof.

The direct-current generator 34 is provided with a field-winding 43 which is energized from a battery 44, through a field-rheostat 45, so that the direct-current voltage generated by the generator 34 may be controlled by proper manipulation of its field-rheostat 45. The armature circuits at the two direct-current machines 34 and 35 are connected together, as indicated at 46, and include a series resistance 47 which is introduced for the purpose of reducing a positive damping in the system, and thus minimizing the harmful effects of any negative damping which may occur, at any speed, in the wound-rotor induction motors, even at high slips approaching the pull-out slip 23, or between about 20% slip and the slip represented by the point 23, where the slope of the torque-slip curve is negative and the damping is negative. The direct-current motor 35 is provided with a field-winding 48 which may be energized from a battery 49, through a field-rheostat 51.

The alternating-current generator 36 is advantageously a synchronous machine, as symbolized by the two exciting-winding sliprings 52, which are excited from a battery 53, through a field-rheostat 54.

In the system shown in Fig. 3, we have also introduced a novel feature which is necessitated by the fact that we have a number of mechanically-unconnected, similar motors 1 which are to be started up in unison with each other, and which are to be operated at corresponding speeds, under a common speed-control arrangement. We have discovered that the starting-performance is considerably improved by permanently bussing together the three-phase primary-winding terminals 56 of the several machines, utilizing a common three-phase bus 57 for this purpose. This common primary bus 57 is, in turn, connected to the supply-line 2 through a suitable switch 58.

In the operation of the system shown in Fig. 3, we prefer to start the synchronous generator 36 from the supply-line 2, as a motor, with the induction motors 1 disconnected from the supply-line, that is, deenergized, as by an opening of the switch 58. After the synchronous generator 36 has been synchronized with the supply-line 2, the field-rheostats of 45 and 51 of the direct-current machines are adjusted so that the speed of the synchronous motor 33 is at a maximum, and the frequency of its polyphase terminals 32 is equal to the frequency of the supply-line 2, which is usually 60 cycles. Under these circumstances, the motor-energizing line-switch 58 may be closed and the motors 1 will remain at standstill, after which the motors 1 may be gradually brought up to speed by adjusting the rheostat 45, for example, of the direct-current generator 34, increasing the output-voltage of said generator, and causing it to begin to supply power to the direct-current motor 35, which is passed on, to the supply line, through the alternating-current generator 36. The speed of the induction motors 1 will adjust themselves in accordance with the amount of power which is taken off of their secondary windings and returned to the line through the motor-generator combination just described.

The external resistance 47, which is included in the circuit between the direct-current generator 34 and the direct-current motor 35, is for the purpose of increasing the positive damping, so that, if the generator 34 should momentarily deliver more current than required by the steady-state conditions, the resistance 47 will produce a voltage-drop which will decrease the amount of energy received by the motor 35, thus damping or counteracting the effect of the momentary increase in the generator-current. The greatest damping effect of the resistance 47 is obtained when the total armature-circuit resistance is equal to the armature-circuit reactance at any given speed of operation of the direct-current machines.

One of the principal effects of the deep-bar design is to obtain an automatically increased secondary-resistance at high slip-frequencies, and our invention, in one of its aspects, broadly covers any means for obtaining this effect, as a means for reducing negative damping. While we prefer the deep-bar construction which has already been described, when designing large wound-rotor induction motors, we believe that it is more economical, in the design of small or moderate sized machines, to produce these automatically varying resistance-changes externally of the machine, because of the greater difficulty in obtaining the effects of eddy-currents in the rotor-windings of these smaller machines.

Figure 4:
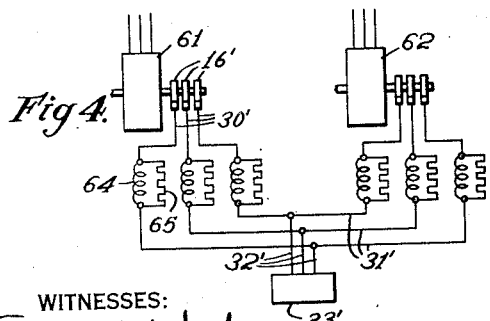
Fig. 4 is a diagrammatic view showing how the deep-bar effect may be obtained by serially connected external reactances shunted by resistances, in a system in which two ordinary wound-rotor induction motors may be controlled from a single energy-translating device in a common secondary circuit.

Fig. 4 shows an alternative form of our invention, therefore, which is preferred when two or more smaller motors are to have their secondary windings connected together, or, in general, when any conventional wound-rotor asynchronous machine is to be doubly-fed. In the system shown in Fig. 4, we utilize conventional wound-rotor machines 61 and 62, which may be identical, and which have polyphase sliprings 16' which are connected to external secondary load-circuits 30' which serially include, in each phase thereof, a reactance 64 shunted by a resistance 65. The two secondary circuits 30' are bussed together, as indicated at 31', and are connected to a common energy-consuming circuit 32' which leads to an energy-translating device which is indicated schematically at 33', and which may represent any device for consuming electrical energy, either with or without regenerative feed-back to the supply-line.

Figure 5:
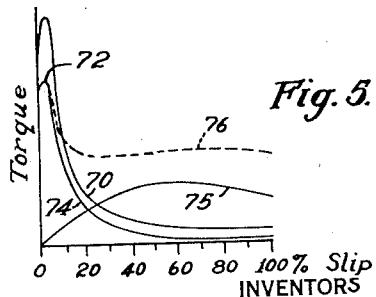
Fig. 5 is a curve-diagram which will be referred to in explanation of the speed-torque characteristics of the motor shown in Fig. 4.

The operation of the system shown in Fig. 4 will be more readily understood by reference to Fig. 5, wherein the speed-torque curve 70 is the speed-torque curve of either one of the motors 61 or 62 with its secondary winding short-circuited. The addition of the reactors 64, assuming that inductive reactance is utilized, (although capacitive reactance could also be utilized), is to somewhat reduce both the pull-out torque 72, and the slope of the speed-torque curve at all speeds below the pull-out speed, as indicated by the curve 74. The addition of the resistors 65, in parallel with the several reactors 64, produces an additional torque which will have a shape somewhat as indicated by the curve 75 in Fig. 5, with a peak at a point where the parallel resistance and reactance are equal. The total resultant torque, resulting from the use of the parallel-connected reactance 64 and resistance 65, will be somewhat as indicated by the curve 76 in Fig. 5. It will be noted that the reactance 64 practically short-circuits the resistance 65 at low slip-frequencies, whereas the resistance 65 becomes more effective at higher frequencies, up to the point where the current divides equally between the resistance and the reactance. By a proper choice of magnitudes and the relative proportions of the resistances and reactances, we can thus exercise a considerable control over the slope of the speed-torque curve, and the speed at which the torque is maximum, in the high-slip operating-range of 12 to 85% slip.

In some cases, in utilizing the resistance-paralleled-reactor method of control which is shown in Fig. 4, it is desirable that the reactance shall be most effective in the circuit between the secondary windings of two mechanically independent similar machines which are controlled from a common speed-controlling means, and that the reactance should be relatively less effective with reference to the currents which are drawn by the common speed-controlling device 33' of Fig. 4.

Figure 6:
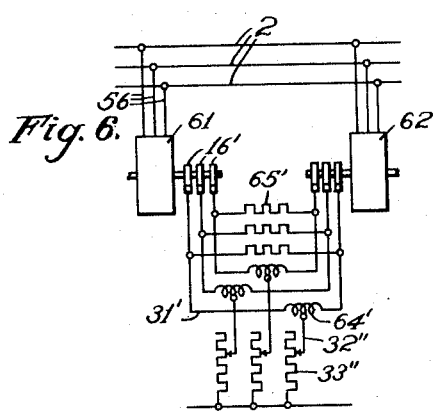
Fig. 6 shows a generally preferable modification of the system shown in Fig. 4, whereby the series external reactors are non-inductively related to the speed-controlling circuit.

A means for bringing about this desirable end is illustrated in Fig. 6, wherein the two reactors 64 (Fig. 4) in each of the phases of the two interconnected secondary windings are mutually coupled together, as indicated by the tapped reactors 64' in Fig. 6, one of said tapped reactors 64' being utilized to each phase of the interconnecting secondary-bus 57, and each reactor 64' being tapped at its midpoint to connect to the load-circuit 32". The resistors 65' are connected across the several reactors 64', respectively.

In Fig. 6, the speed-controlling load-device 33", which is utilized for jointly controlling the speeds of the two motors 61 and 62, is illustrated in the form of a variable resistance.

The operation of the device shown in Fig. 6 is identical with that of Fig. 4, insofar as the suppression of hunting between the two machines 61 and 62 is concerned. Since the two halves of the inductors 64' are mutually coupled, and since the two induction motors 61 and 62 are similar in size and loading, the secondary currents of the two machines are normally equal, in phase and magnitude, so that the secondary currents will flow non-inductively through the respective halves of the reactors 64', so as to combine in the common load-circuit 32" without encountering any voltage-drop in the reactance. In this manner, the power-factor of the motors is considerably improved over the conditions existing in Fig. 4.

Figure 7:
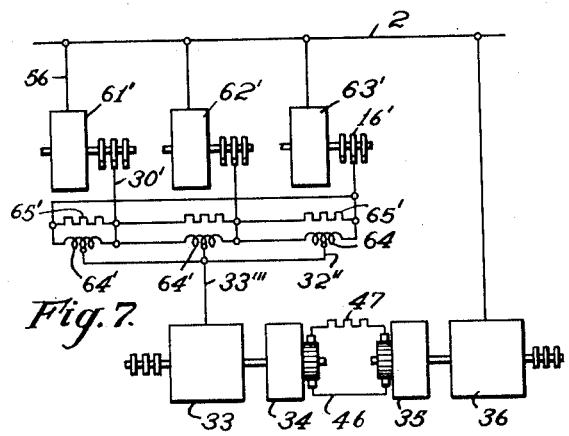
Fig. 7 shows how the non-inductive reactor-arrangement may be extended to a speed-control system having more than two motors, and otherwise having an arrangement, similar to that shown in Fig. 3, for returning secondary-energy to the electrical line from which the primary windings of the motor are energized.

Fig. 7 shows the extension of the ideas just explained, in connection with Fig. 6, to a system in which more than two identical motors 61', 62', 63' are utilized. For purposes of simplicity, Fig. 7 is presented in the form of a single-line diagram in which only a single phase of the three-phase circuits is indicated, in accordance with a commonly understood convention. In order to provide a non-inductive external secondary circuit for the normally equal secondary currents of the several motors, while providing for an effective inductance 64' between any pair of motors, we may utilize, in each secondary phase, as many tapped inductors 64' as there are motors, connecting said inductors, in mesh, to all of the motor sliprings 16', of each phase, as indicated in Fig. 7, and shunting each inductor 64' with a resistance 65' as shown. The tapped points 32" of the several inductors 64' may be connected together, to the terminal 33''' of the speed-controlling energy-consuming device, such as the synchronous motor 33 of the system shown in Fig. 3.

In the operation of the system shown in Fig. 7, the secondary current in each slipring-terminal 30' of the motors 61', 62' and 63' divides into two equal parts, and one-half of this current flows through one-half of each of two reactors 64'. Since the secondary currents of all three motors are equal to each other and in phase with each other, these halves of the several phase-currents neutralize each other in the several reactors 64', so that the secondary currents flow non-inductively into the primary terminal 33''' of the synchronous motor 33, after which the power is transferred back to the supply-line through the conversion-means shown and described in connection with Fig. 3. The motor-secondary current just traced in the useful load-current of the motor, which controls its speed. When it comes to a consideration of the circulating currents between the different motor-secondaries, as a result of transient disturbances in the exact balance between the several machines, it will be noted that the entire values of the reactors 64' are effective in the interconnecting circuits between two machine-secondaries, so that the same correction of the negative-damping effect is obtained as has been explained in connection with Figs. 4 and 5.

In carrying out our invention, it may sometimes be more convenient to correct the slope of the speed-torque curve in two stages, rather than one, so as to give the torque a boost at two different values of slip. Thus, both in the case of the deep-bar design of special machines, and in the case of the resistance-shunted external reactors with standard machines, the effect, in each case, is to put a small hump in the speed-torque curve at a predetermined speed, dependent upon the relation between resistance and reactance. These effects may be combined, by using two or more of them at the same time.

Thus, in Fig. 8, a speed-torque curve of the general shape shown at 81 may be obtained with extremely deep bars, as indicated at 82, wherein the eddy-current skin-effect is so great that it gives the speed-torque curve an intermediate hump at a relatively low slip, such as 20 or 30%, as indicated at 83. On the other hand, a winding having bars half as deep, as indicated at 84, might produce a speed-torque curve of the general nature shown at 85, wherein an intermediate hump is produced at about 100% slip, or even more than 100%, as indicated at 86. A wound-rotor motor built with some of its bars arranged as deep-bars 82' and other bars stranded as indicated at 84', as indicated at 87 in Fig. 8, with the deep and stranded bars connected in series, might produce a resultant speed-torque curve of the type shown at 88 in Fig. 8, thereby producing a rising torque-slip curve over a wide range of slips from about 10 or 15% to 100% slip.

In Fig. 9, we illustrate how the design-method described in connection with Fig. 8 can be applied to standard machines having low-resistance secondary windings, with external impedance-devices in the form of resistance-shunted reactors, by utilizing a plurality of pairs of such resistance-shunted reactors, as indicated at 90 and 91, respectively, said pairs having different ratios of resistance to reactance, so that they reach their maximum effectiveness at different slip-frequencies.

While we have described and illustrated our invention in several forms of embodiment which we now prefer, and in accordance with our present understanding of the theory of operation of the device, we wish it to be understood that our invention is not altogether limited to the specific forms or theories shown or explained, as various changes may be made by those skilled in the art without departing from the essential features of our invention, particularly in its broader aspects. We desire, therefore, that the appended claims shall be accorded the broadest construction consistent with their language.

We claim as our invention:

1. A wound-rotor asynchronous machine, adapted to have a high range of speed-control when operated under doubly-fed conditions, said machine having a stator member comprising a magnetizable core and a polyphase primary winding, and a rotor member comprising a magnetizable core and a secondary winding, and a plurality of sliprings connected to said secondary winding in such manner as to provide polyphase terminals therefor, said secondary winding having bars of a sufficient radial depth to give the machine a speed-torque curve (with the secondary winding short-circuited) which has a standstill torque which is at least as high as 0.7 times the torque at 20% slip, said bars being of a sufficient cross-sectional area to give the machine a peak pull-out torque at less than 12% slip, with a rapidly falling torque at slips slightly in excess of the pull-out torque, and still enable the machine to operate without overheating in the range from 20 to 60% slip.

2. A wound-rotor asynchronous machine, adapted to have a high range of speed-control when operated under doubly-fed conditions, said machine having a stator member comprising a magnetizable core and a polyphase primary winding, and a rotor member comprising a magnetizable core and a secondary winding, and a plurality of sliprings connected to said secondary winding in such manner as to provide polyphase terminals therefor, said secondary winding having bars of a sufficient radial depth to give the machine a speed-torque curve (with the secondary winding short-circuited) which has a torque at 85% slip, which is higher than the torque at 20% slip, said bars being of a sufficient cross-sectional area to give the machine a peak pull-out torque at less than 12% slip, with a rapidly falling torque at slips slightly in excess of the pull-out torque, and still enable the machine to operate without overheating in the range from 20 to 60% slip.

3. A wound-rotor asynchronous machine adapted to operate stably over a wide range of speeds at a given primary frequency, said machine having a stator member comprising a magnetizable core and a polyphase primary winding, and a rotor member comprising a magnetizable core and a secondary winding, and a plurality of sliprings connected to said secondary winding in such manner as to provide polyphase terminals therefor, said secondary winding having bars of a sufficient radial depth to give the machine a speed-torque curve (with the secondary winding short-circuited) which has a standstill torque which is at least as high as 0.7 times the torque at 20% slip, said bars being of a sufficient cross-sectional area to give the machine a peak pull-out torque at less than 12% slip, with a rapidly falling torque at slips slightly in excess of the pull-out torque, and still enable the machine to operate without overheating in the range from 20 to 80% slip.

4. A wound-rotor asynchronous machine adapted to operate stably over a wide range of speeds at a given primary frequency, said machine having a stator member comprising a magnetizable core and a polyphase primary winding, and a rotor member comprising a magnetizable core and a secondary winding, and a plurality of sliprings connected to said secondary winding in such manner as to provide polyphase terminals therefor, said secondary winding having bars of a sufficient radial depth to give the machine a speed-torque curve (with the secondary winding short-circuited) which has a torque at 85% slip, which is higher than the torque at 20% slip, said bars being of a sufficient cross-sectional area to give the machine a peak pull-out torque at less than 12% slip, with a rapidly falling torque at slips slightly in excess of the pull-out torque, and still enable the machine to operate without overheating in the range from 20 to 80% slip.

5. A wound-rotor asynchronous machine adapted to operate stably over a wide range of speeds at a given primary frequency, said machine having a stator member comprising a magnetizable core and a polyphase primary winding, and a rotor member comprising a magnetizable core and a secondary winding, and a plurality of sliprings connected to said secondary winding in such manner as to provide polyphase terminals therefor, said secondary winding being included in a circuit of a kind having substantially the same electrical effect as a serially connected reactance shunted by a resistance, of such values as to give the machine a speed-torque curve (with no other resistance in the secondary circuit) which has a standstill torque which is at least as high as 0.7 times the torque at 20% slip, the secondary winding having such cross-sectional area and the effective reactance of the secondary-winding circuit having such low resistance as to give the machine a peak pull-out torque at less than 12% slip, with a rapidly falling torque at slips slightly in excess of the pull-out torque, and the secondary-winding circuit having such thermal characteristics as to enable the machine to operate without overheating in the range from 20 to 60% slip.

6. A wound-rotor asynchronous machine adapted to operate stably over a wide range of speeds at a given primary frequency, said machine having a stator member comprising a magnetizable core and a polyphase primary winding, and a rotor member comprising a magnetizable core and a secondary winding, and a plurality of sliprings connected to said secondary winding in such manner as to provide polyphase terminals therefor, said secondary winding being included in a circuit of a kind having substantially the same electrical effect as a serially connected reactance shunted by a resistance of such values as to give the machine a speed-torque curve (with no other resistance in the secondary circuit) which has a torque at 85% slip, which is higher than the torque at 20% slip, the secondary winding having such cross-sectional area and the effective reactance of the secondary-winding circuit having such low resistance as to give the machine a peak pull-out torque at less than 12% slip, with a rapidly falling torque at slips slightly in excess of the pull-out torque, and the secondary-winding circuit having such thermal characteristics as to enable the machine to operate without overheating in the range from 20 to 60% slip.

7. The invention as defined in claim 5, characterized by said resistance-shunted secondary reactance being an inductance.

8. The invention as defined in claim 6, characterized by said resistance-shunted secondary reactance being an inductance.

9. In combination, a wound-rotor asynchronous machine, a mechanically unconnected second alternating-current dynamo-electric machine, a serial electrical connection-means adapted to serially electrically connect an alternating-current circuit of said second dynamo-electric machine to the wound-rotor secondary circuit of said asynchronous machine, and an impedance-device included in said serial electrical connection, said impedance-device being of a kind having substantially the same electrical effect as a reactance shunted by a resistance.

10. In combination, a wound-rotor asynchronous machine, a mechanically unconnected second alternating-current dynamo-electric machine, a serial electrical connection - means adapted to serially electrically connect an alternating-current circuit of said second dynamo-electric machine to the wound-rotor secondary circuit of said asynchronous machine, and an impedance-device included in said serial electrical connection, said impedance-device being of a kind having substantially the same electrical effect as an inductance shunted by a resistance.

11. In combination, a plurality of mechanically unconnected similar wound-rotor asynchronous machines, a common speed-controlling energy-translating device for said plurality of asynchronous machines, and connections adapted to be made from the several wound-rotor secondary circuits of said asynchronous machines to each other and to said energy-translating device so that the wound-rotor secondary circuits are in parallel-circuit relation to each other across the terminals of said energy-translating device, said several connections including serially connected impedance effective in the circuits connecting the several wound-rotor secondary circuits, said serially connected impedance being of a kind having substantially the same electrical effect as a reactance shunted by a resistance.

12. In combination, a plurality of mechanically unconnected similar wound-rotor asynchronous machines, a common speed-controlling energy-translating device for said plurality of asynchronous machines, and connections adapted to be made from the several wound-rotor secondary circuits of said asynchronous machines to each other and to said energy-translating device so that the wound-rotor secondary circuits are in parallel-circuit relation to each other across the terminals of said energy-translating device, said several connections including serially connected impedance effective in the circuits connecting the several wound-rotor secondary circuits, said serially connected impedance being of a kind having substantially the same electrical effect as an inductance shunted by a resistance.

13. In combination, a plurality of mechanically unconnected similar wound-rotor asynchronous machines, a common speed-controlling energy-translating device for said plurality of asynchronous machines, and connections adapted to be made from the several wound-rotor secondary circuits of said asynchronous machines to each other and to said energy-translating device so that the wound-rotor secondary circuits are in parallel-circuit relation to each other across the terminals of said energy-translating device, said several connections including serially connected impedance effective in the circuits connecting the several wound-rotor secondary circuits, said serially connected impedance being of a kind having substantially the same electrical effect as an inductance shunted by a resistance, with the inductance arranged in effective series-circuit relation between the wound rotor members of two asynchronous machines, and arranged in a less effective inductance relation in the connections to said energy-translating device.

14. In combination, a plurality of mechanically unconnected similar wound-rotor asynchronous machines, a common speed-controlling energy-translating device for said plurality of asynchronous machines, and connections adapted to be made from the several wound-rotor secondary circuits of said asynchronous machines to each other and to said energy-translating device so that the wound-rotor secondary circuits are in parallel-circuit relation to each other across the terminals of said energy-translating device, each of said asynchronous machines having a secondary winding having bars of a sufficient radial depth to give the machine a speed-torque curve (with the secondary winding short-circuited) which has a standstill torque which is at least as high as 0.7 times the torque at 20% slip, said bars being of a sufficient cross-sectional area to give the machine a peak pull-out torque at less than 12% slip, with a rapidly falling torque at slips slightly in excess of the pull-out torque, and still enable the machine to operate without overheating in the range from 20 to 60% slip.

15. In combination, a plurality of mechanically unconnected similar wound-rotor asynchronous machines, a common speed-controlling energy-translating device for said plurality of asynchronous machines, and connections adapted to be made from the several wound-rotor secondary circuits of said asynchronous machines to each other and to said energy-translating device so that the wound-rotor secondary circuits are in parallel-circuit relation to each other across the terminals of said energy-translating device, each of said asynchronous machines having a secondary winding having bars of a sufficient radial depth to give the machine a speed-torque curve (with the secondary winding short-circuited) which has a torque at 85% slip, which is higher than the torque at 20% slip, said bars being of a sufficient cross-sectional area to give the machine a peak pull-out torque at less than 12% slip, with a rapidly falling torque at slips slightly in excess of the pull-out torque, and still enable the machine to operate without overheating in the range from 20 to 80% slip.

16. In combination, a wound-rotor asynchronous machine adapted to operate stably over a wide range of speeds at a given primary frequency, said asynchronous machine comprising a polyphase primary member adapted to receive power from a polyphase supply-line, and a polyphase wound-rotor secondary member, and substantially stable speed-controlling means therefor, comprising a polyphase synchronous motor adapted to be energized from said wound-rotor secondary member, a direct-current generator adapted to be driven from said synchronous motor, a direct-current motor adapted to be energized from said direct-current generator, a stabilizing resistor adapted to be serially included in the circuit between said two direct-current machines, and a polyphase generator adapted to be driven by said direct-current motor and adapted to be connected to said polyphase supply-line whereby said polyphase generator is adapted to return power to said polyphase supply-line.

17. In combination, a wound-rotor asynchronous machine adapted to operate stably over a wide range of speeds at a given primary frequency, said asynchronous machine comprising a polyphase primary member adapted to receive power from a polyphase supply-line, and a polyphase wound-rotor secondary member, and substantially stable speed-controlling means therefor, comprising a first dynamo-electric converting-means for changing the variable-frequency secondary current of said asynchronous machine to direct-current energy, a second dynamo-electric converting-means for changing said direct-current energy to polyphase energy of line-frequency, terminal connections adapted to connect the first dynamo-electric converting-means to the secondary member of the asynchronous machine, a direct-current circuit adapted to connect the two dynamo-electric converting-means, terminal connections adapted to connect the second dynamo-electric converting-means to the polyphase supply-line, and a stabilizing resistor serially included in the direct-current circuit between said two converting-means.

18. In combination, a plurality of mechanically unconnected similar asynchronous machines adapted to operate stably over a wide range of speeds at a given primary frequency, each asynchronous machine comprising a polyphase primary member adapted to receive power from a common polyphase supply-line, and a polyphase wound-rotor secondary member, and substantially stable speed-controlling means therefor, comprising a common dynamo-electric converting-means for changing the variable-frequency secondary currents of all of said asynchronous machines to polyphase energy of line-frequency, and terminal connections for returning said line-frequency electrical energy from the several secondary circuits of the asynchronous machines to said polyphase supply-line, the several secondary circuits of the asynchronous machines being of a kind having substantially the same electrical effect as a serially connected reactance shunted by a resistance of such values as to substantially eliminate the hunting effects of negative damping in said asynchronous machines.

19. In combination, a wound-rotor asynchronous machine, a mechanically unconnected second alternating-current dynamo-electric machine, and a serial electrical connection-means adapted to serially electrically connect an alternating-current circuit of said second dynamo-electric machine to the wound-rotor secondary circuit of said asynchronous machine, the circuit including said serial connection-means and the connected circuits of the respective machines including an impedance of a kind having substantially the same electrical effect as an inductance shunted by a resistance.

LEE A. KILGORE.
      MICHAEL LIWSCHITZ.